Nov. 26, 1929.  F. R. PETERS  1,736,886
BOOSTER CONTROL
Filed July 9, 1927   4 Sheets-Sheet 4
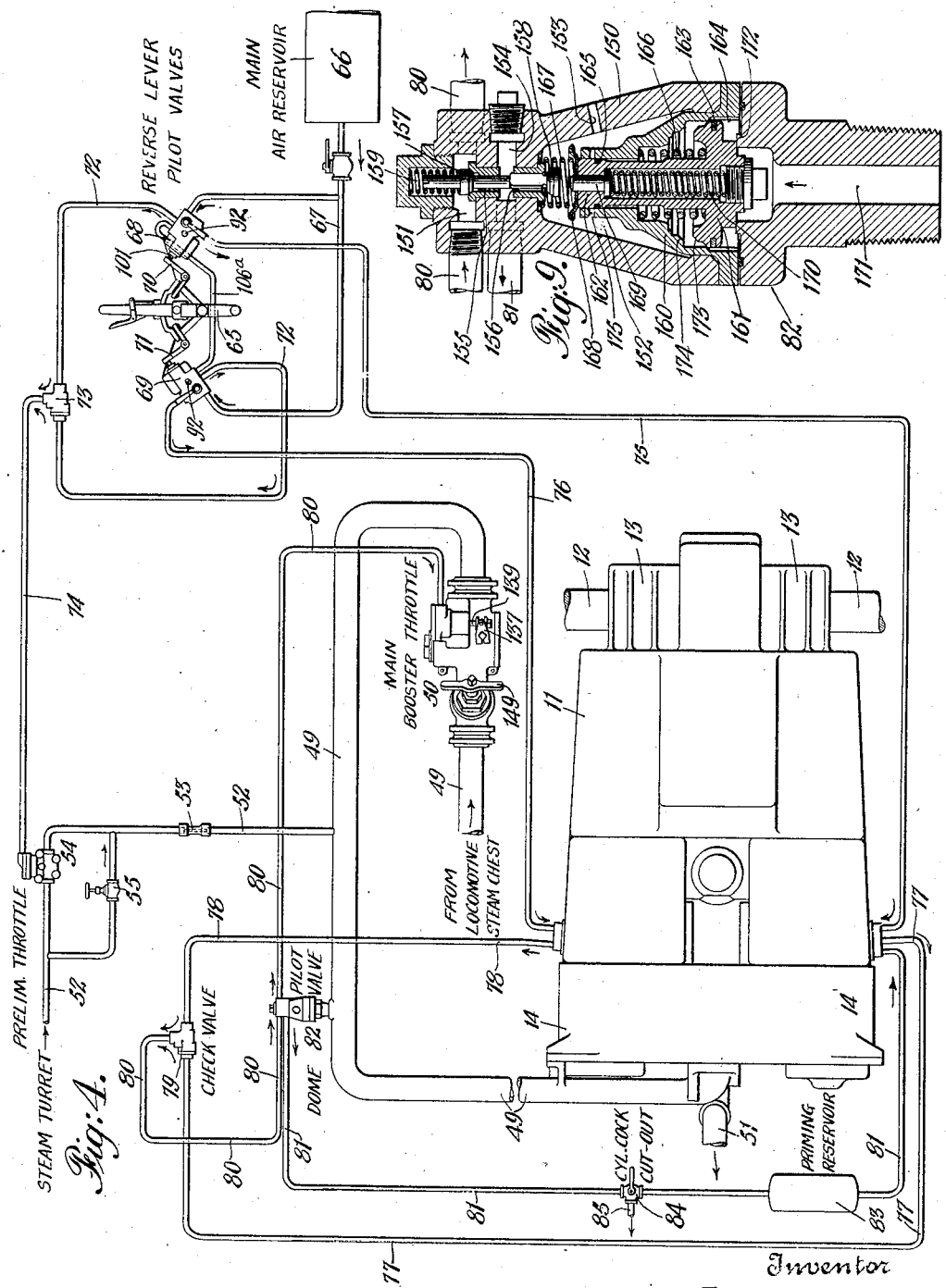
Inventor
FRANK R. PETERS
By his Attorneys
Synnestvedt + Lechner Patented Nov. 26, 1929

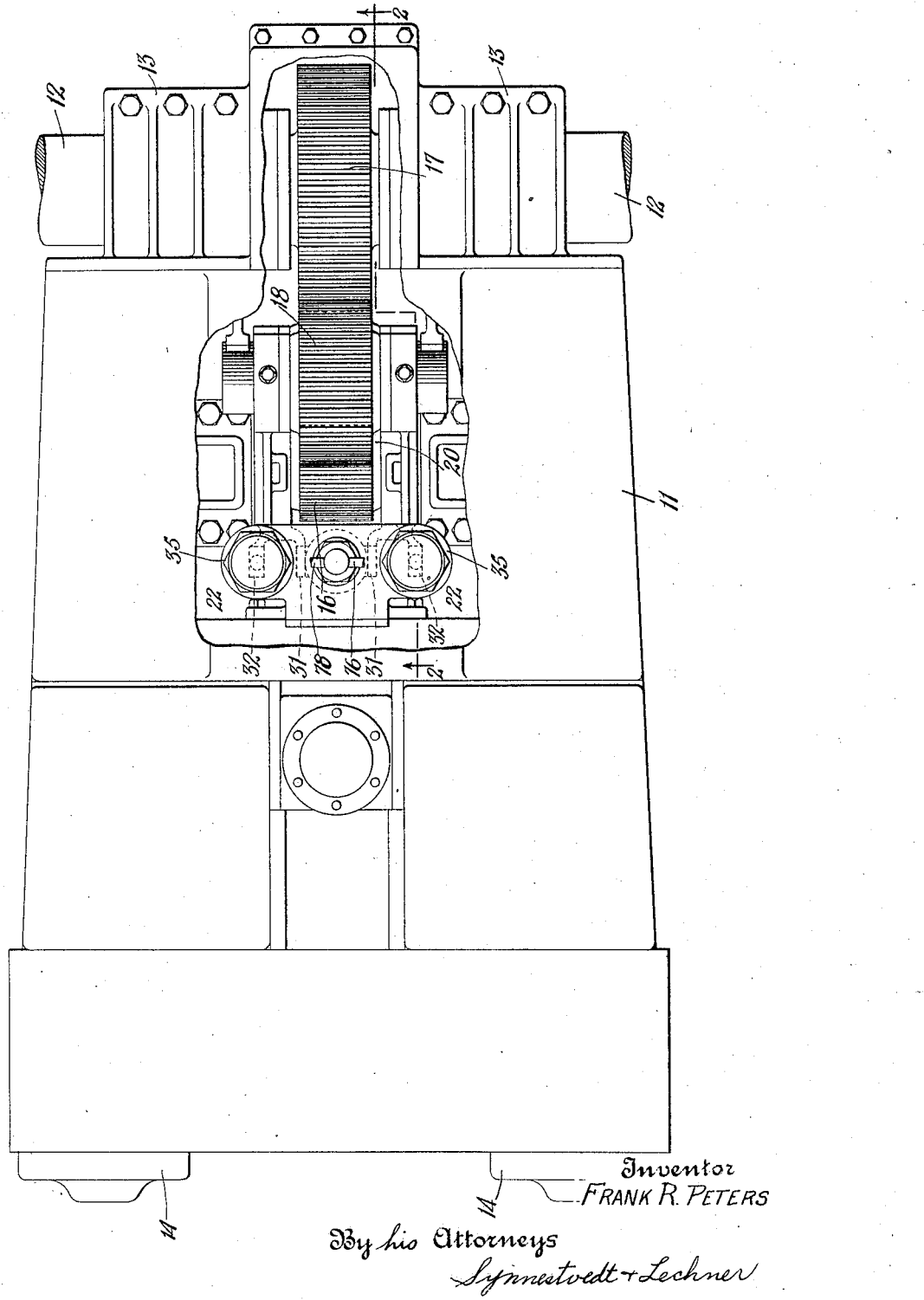

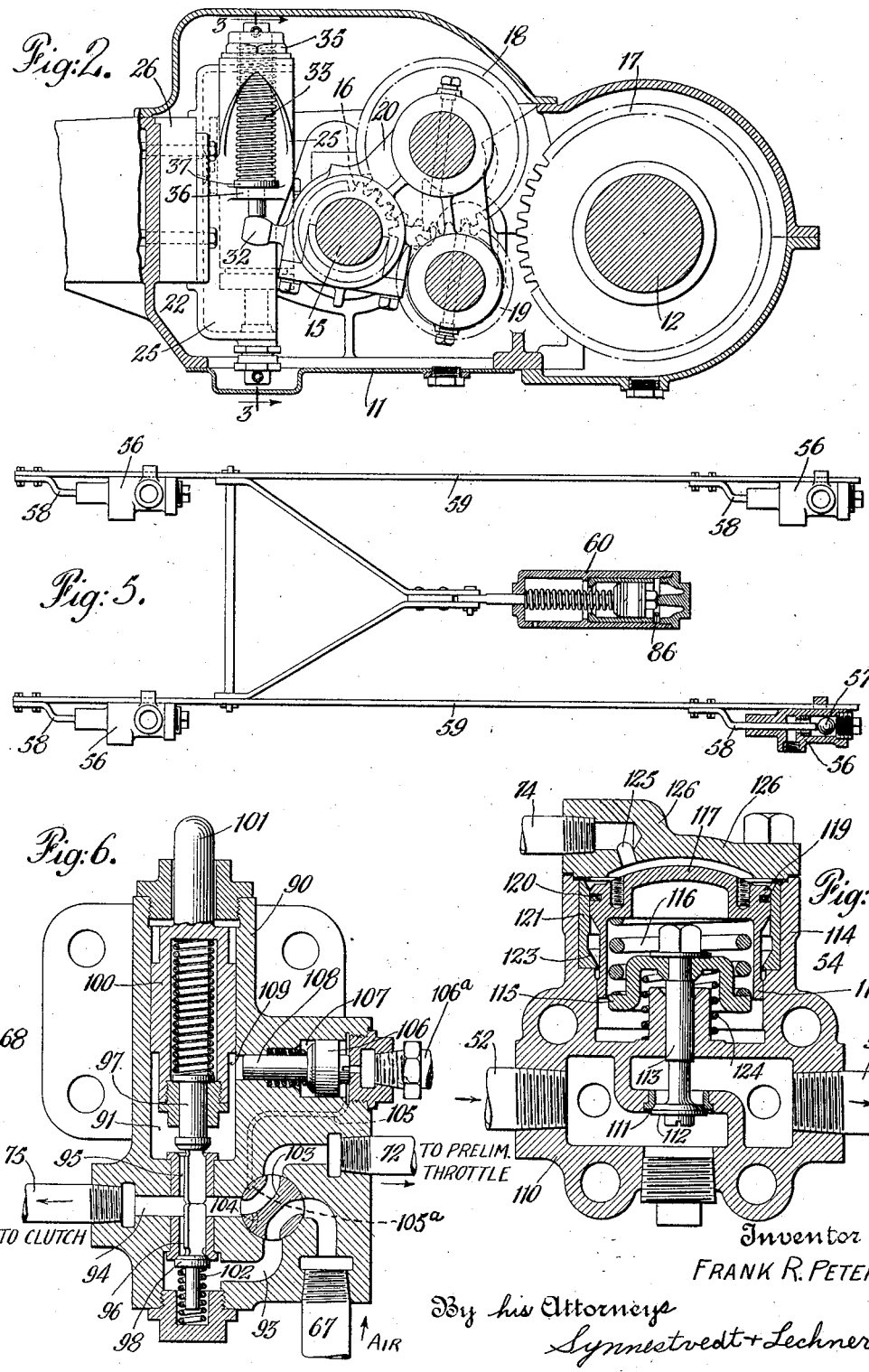

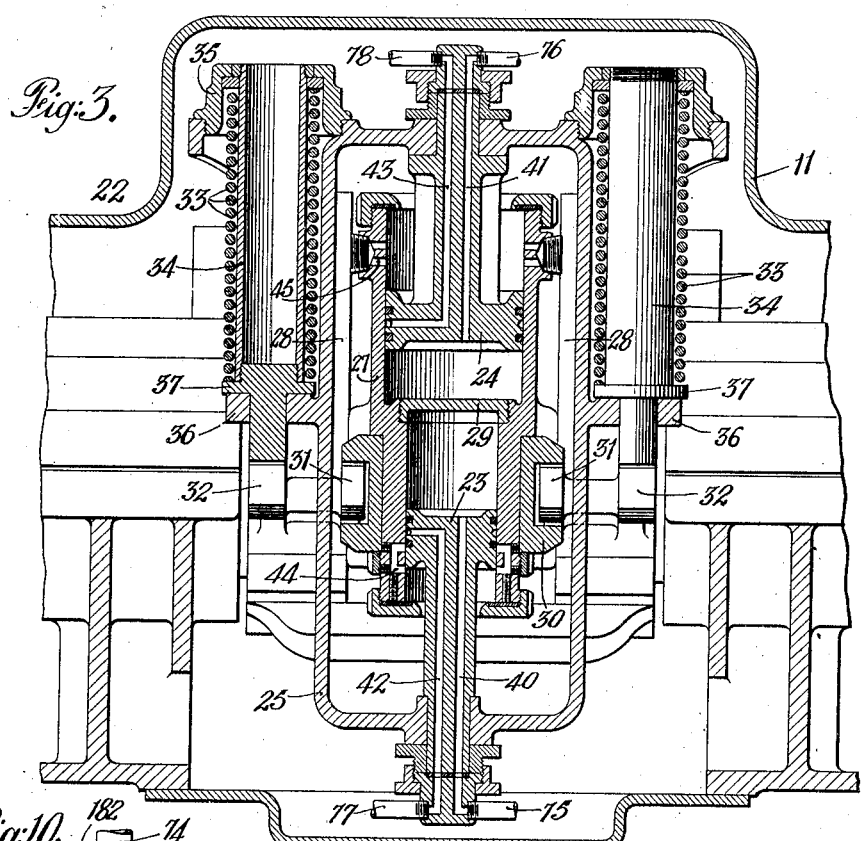

1,736,886

UNITED STATES PATENT OFFICE

FRANK RICHARD PETERS, OF NEW YORK, N. Y., ASSIGNOR TO FRANKLIN RAILWAY SUPPLY COMPANY, OF NEW YORK, N. Y., A CORPORATION OF DELAWARE

BOOSTER CONTROL

Application filed July 9, 1927. Serial No. 204,509.

My invention relates to booster control, and is especially adapted for controlling the operation of railway boosters designed to aid the locomotive in either forward or backward running. I aim to provide a simple and reliable controlling system for such boosters, and, in general, to provide for automatically maintaining a proper correlation or sequence of operations in starting, stopping, or reversing the booster power. How these and other advantages can be realized through the invention will appear from my description hereinafter of a selected and preferred form of embodiment.

I have here illustrated and explained the system as applied to a booster, such as shown in the application of M. J. Forker and M. H. Roberts, Serial No. 142,974, filed October 20, 1026, now Patent No. 1,686,710, granted October 9, 1928, and assigned to the assignee of this application.

In the drawings—

Fig. 1 is a plan view of a booster for aiding a locomotive in either forward or backward running, with its external case partly broken open to expose some of the operating parts.

Fig. 2 is a fragmentary fore and aft vertical section, taken as indicated by the line 2—2 in Fig. 1.

Fig. 3 shows an enlarged transverse vertical section through the reversing motor, taken as indicated by the line 3—3 in Fig. 2.

Fig. 4 is a diagrammatic illustration of the booster and control system as a whole.

Fig. 5 shows a plan view of the cylinder cock mechanism for the booster cylinders, with one of the cocks and an operating cylinder in horizontal section.

Fig. 6 shows a vertical section through a controlling or pilot valve device for the system as shown in Fig. 4.

Fig. 7 shows a vertical section through a pressure-operated "preliminary" throttle, for admitting steam to idle and warm the booster in advance of regular operation.

Fig. 8 shows a vertical section through a pressure-operated main booster throttle.

Fig. 9 shows a vertical section through a pressure-operated "pilot" valve for controlling the operation of the cylinder cock mechanism.

Fig. 10 shows a vertical section through a double check-valve.

As shown in Fig. 1, the booster 11 is mounted and supported at one end on an axle 12 which it is intended to drive, being provided with axle bearings 13, 13. The axle 12 may be any ordinarily non-driving axle of a locomotive, tender, or other railway car. The booster 11 is of the usual double cylinder steam engine type, with cylinders 14, 14 at the opposite end from the axle 12. In the present instance, reversal of the direction of drive of the booster 11 is accomplished by varying the transmission connections from the engine or motor to the axle 12. The transverse booster crank shaft 15 carries a pinion 16 which drives a gear 17 on the axle 12 through connections comprising idler pinions 18 and 19 on a rocker 20 pivotally mounted on the crank shaft 15. As shown in Fig. 2, the larger idler pinion 18 is constantly in mesh with the driving pinion 15 and with the smaller idler pinion 19, and the latter is always out of mesh with the driving pinion 15. In Fig. 2, the rocker 20 is shown in neutral, "disentrained position", with both idler pinions 18 and 19 out of mesh with the driving pinion 17 on the axle 12. By swinging the rocker 20 downward and to the right (clockwise) in Fig. 2, the idler pinion 18 will be brought into mesh or entrained with the axle gear 17 for forward driving; while by swinging the rocker 20 upward and to the left in Fig. 2 (counter-clock-wise), the idler pinion 19 will be brought into mesh or entrained with the axle gear 17 for reverse driving or backing.

As shown in Figs. 1, 2, and 3, a pressure operated motor device 22 may be provided for shifting the rocker 20 to throw the booster into gear, either forward or reverse, as above described. This motor device 22 comprises a couple of axially alined stationary pistons 23, 24, (the upper shown larger than the lower) with their rods or stems fixedly mounted in opposite ends of a hollow body or yoke structure 25, that is, itself fixed to the booster frame at 26, and a "floating" cylinder 27 movable up and down around the pistons 23, 24, between guideways 28, 28 on the structure 25. The pressure chambers in opposite ends of the cylinder 27 are separated by a transverse septum 29 therein. On the lower end of the cylinder 27 is fixed a collar part 30 with lateral grooves or recesses in which are engaged the rounded inner forks 31, 31 of arms on the rocker 20. The outer round-ended forks 32, 32 of these rocker arms extend to either side of the yoke structure 25, in position to be acted on by means adapted to counterbalance the tendency of the rocker 20 to gravitate into forward driving position.

For this latter purpose, there are helical compression springs 33, 33 at either side of the yoke structure 25, mounted around and acting on slide members 34, 34 whose lower ends are adapted to engage the rocker arms 32, 32. As shown in Figs. 2 and 3, the upper end of each slide member 34 extends through a guide opening in a hollow sleeve-like bracket 35 at the top of the structure 25, while its lower end projects through a lateral lug 36 on the structure 25. The springs 33 oppose clockwise forward-entraining movement of the rocker 20. The counter-clockwise action of each spring 33 on the rocker 20 is limited, by engagement of a shoulder 37 at its lower end with the lug 36, to the mid-position shown in Fig. 2. At the same time, the rocker 20 is perfectly free for counter-clockwise movement beyond the position of Fig. 2, by the action of its motor device 22.

When it is desired to throw the booster into either forward or reverse, pressure fluid is admitted to the corresponding (lower or upper) pressure chamber of the cylinder 27, through a duct 40 or 41 in the stem of the corresponding piston 23 or 24, thus correspondingly shifting the rocker 20 through the action of the cylinder 27 on the arms 31, 31. As the cylinder 27 attains the corresponding limit of its movement in either case, a duct 42 or 43 in the corresponding piston 23 or 24 is brought into registry with the lower end of a U-shaped duct 44 or 45 in the cylinder wall, whose upper end is concurrently exposed and opened into direct communication with the corresponding pressure chamber of the cylinder 27. Thus the fluid pressure from the latter is allowed to pass through the duct 42 or 43 to open the main booster throttle, as hereinafter described, for operation of the booster. When the pressure on the piston 23 or 24 is released, either the action of the springs 33, 33 or gravity will return the rocker 20 to mid-position, as shown in Fig. 2.

The parts and features thus far described form the subject of the above mentioned application of Forker and Roberts, Serial No. 142,974.

The booster control system, with which my present invention is more especially concerned, is diagrammatically illustrated in Fig. 4. As there indicated, the booster 11 receives its supply of steam from the steam chest of the locomotive through a pipe line 49 controlled by the main booster throttle 50 and exhausts through a pipe line 51. Provision is made for preliminary admission of steam to turn over and warm the booster 11, through a pipe line 52 delivering through a "choke" 53 to the main booster supply pipe 49 beyond the throttle 50 and controlled by a "preliminary throttle" 54. A by-pass around the preliminary throttle 54 controlled by a needle valve 55, allows a small amount of steam to be blown through the booster in cold weather to keep it from freezing. The booster cylinders 14, 14 may be provided with the usual pressure-operated cylinder cock mechanism (see also Fig. 5) for draining them of water of condensation when steam is first admitted, comprising a plurality of drain cocks 56 whose balls 57 are normally held unseated by stems 58 attached to interconnected longitudinal slide bars 59 operated by a spring and piston motor 60. Admission of pressure fluid to the motor 60 forces its piston to the left against the spring and allows the ball valves 57 to seat and close the cylinder cocks, while, when the pressure is released, the valves open again under the action of the spring.

As shown in Fig. 4, the system is controlled by the main locomotive reverse lever 65, the booster 11 being thrown into forward or reverse whenever the reverse lever 65 is "thrown into the corner" to put the locomotive into full gear forward or reverse, and being thrown out of operation when the locomotive reverse lever 65 is returned toward mid-position. The sequence of operations when the booster is thus thrown in is, briefly, as follows:—

First, the preliminary throttle 54 is opened to admit steam through the choke 53 to the pipe 49 and the booster cylinders 14, so as to idle the booster and warm it up. At about the same time, or shortly after, one or the other of the pistons 23, 24 is operated to throw the booster 11 into full gear forward or reverse. The throwing in of the booster 11 for either forward or reverse results, as already described, in opening the main booster throttle 50 to give full admission of steam to operate the now entrained booster and thereby assist in driving the locomotive. After the admission of full steam pressure to the pipe 49, the motor 60 operates the slide rods 59, etc., to allow the cylinder cocks 56 to close. The closing of the cylinder cocks 56 in this manner is delayed, however, a suitable interval after the opening of the main throttle 50, to allow the full steam pressure to blow any water out of the booster cylinders 14, 14. When the reverse lever 65 is returned from either "corner" toward mid-position, the corresponding pilot valve 68, 69 is released, and the booster 11 is thrown out of operation by a reverse action.

As illustrated in Fig. 4, the control system for throwing the booster 11 into and out of operation in this manner may be fluid-operated, preferably by air from the main air reservoir 66 of the locomotive. As shown in Fig. 4, there is a valved and branching supply pipe line 67 from the air reservoir 66 to a couple of pilot valves 68, 69, which are actuated by the locomotive reverse lever 65 when the latter is thrown into either "corner", through corresponding rockers 70, 71. These valves 68, 69 admit and exhaust the air to and from the control system, as hereinafter described. For the preliminary throttle 54, there are pipe connections 72, 72 from pilot valves 68, 69, which unite at a double check valve 73 in a common line 74. For the booster-entraining motor device 22, there are pipe lines 75, 76 connected to the admission ports 40, 41 in the pistons 23, 24. For the main booster throttle 50 there are pipe lines 77, 78 from the exhaust ports 42, 43 in the pistons 23, 24, which unite at a check valve 79 (similar to the check valve 73) in a common pipe line 80. For the cylinder cocks 56 there is a branch pipe line 81 from the pipe line 80 to the spring and piston motor 60, controlled by a pilot valve 82 responsive to the steam pressure in the pipe 49. As shown in Fig. 4, a reservoir 83 of substantial capacity is interposed in the pipe line 81, to delay the closing of the cylinder cocks 56 by the spring and piston motor 60 after the admission of full pressure to the pipe line 49 by the opening of the main booster throttle 50: i. e., this reservoir 83 must be filled by the pressure fluid in the line 81 before the pressure can build up in the motor 60 sufficiently to operate the latter. As here shown, there is a cut-out valve 84 in the line 81 for cutting the cylinder cocks out of operation with an exhaust connection 85.

As shown in Fig. 6, each of the pilot valves 68 (or 69) comprises a casing 90 containing an exhaust chamber or space 91, with a lateral exhaust port 92 (Fig. 4); a pressure chamber or space 93, to which the air supply pipe 67 is connected; and an intermediate chamber or space 94, to which the preliminary throttle line 72 and the line 75 (or 76) to the booster-entraining motor 22 are connected. For connecting the intermediate chamber 94 with the exhaust space 91 and with the pressure chamber 93, there are alined ports 95 and 96 controlled by valves 97 and 98 adapted to seat over the ports in the chambers 91 and 93, and engaging one another end to end in the intermediate space 94. The valve 97 is spring-mounted in a piston member 100 movable toward and away from the port 95 in the chamber 91, and provided with a stem 101 projecting out through the case 90 to engage the rocker 70 (or 71). The valve 98 is urged upward, toward its seat in the chamber 93 and against the end of the valve 95, by a helical compression spring 102.

When the reverse lever 65 is in an intermediate position, out of engagement with the rocker 70, the valves 97 and 98 occupy the positions shown in Fig. 6, so that the pipes 72 and 75 are open to exhaust through the port 95, while the pressure port 96 is closed by the valve 98. When the reverse lever 65 is thrown into the corner, on the other hand, it pushes the stem 101 inward, closing the exhaust port 95 and opening the port 96, thus admitting pressure to the pipes 72 and 75 to open the preliminary throttle 54 and entrain the booster 11, etc., in the manner already described. When the reverse lever 65 is returned toward mid-position, the valves 97 and 98 and the other parts return to their positions shown in Fig. 6, shutting off the pressure and opening the pipes 72 and 75 to exhaust—thereby closing the preliminary throttle 54 and disentraining the booster 11, etc.

As shown in Fig. 6, a double ported rotary plug valve 103 is mounted in the casing 90 across the passages from the pipes 67 and 72 to the chambers 93 and 94, etc. In the position shown in Fig. 6 this valve 103 leaves both of these passages open, but shuts them off from one another. When turned 90 degrees from the position shown, however, the valve 103 shuts off pressure from the chamber 93 and admits it from the pipe 67 directly to the pipe 72, thus causing the preliminary throttle 54 to be opened and the booster 11 to be idled and warmed up, regardless of the valves 97 and 98 and the reverse lever 65, —as may be desirable after the booster has not been operated for a considerable time. With the valve 103 in this position, a small port 104 therein is in registry with a port 105 in the casing 90, so as to admit pressure behind a spring-pressed piston 106 in a chamber or bore 107 in the casing 90. Thus a stem 108 on said piston 106 is projected inward beneath a lower shoulder 109 on the piston 100, locking the latter against inward movement by the rocker 70. This makes it impossible to throw the booster into operation during or after an idling period until after the valve 103 is returned to the position shown in Fig. 6 and the pressure back of the piston 106 exhausted through the port 105ª.

By connecting the chamber behind the piston 106 in one of the pilot valves with the corresponding chamber in the other pilot valve as is done by means of the pipe 106ª, it is possible to lock both pilot valves, regardless of which valve 103 is being utilized for an idling operation of the booster. It is also possible to dispense entirely with the valve 103 in one of the pilot valves in which event the body of such pilot valve would be cored so as to connect the pipe 67 to the chamber 93 and the pipe 72 to the chamber 94.

As shown in Fig. 7, the preliminary throttle 54 comprises a casing 110 with a port 111 controlled by a valve 112 arranged to open against the steam pressure, and operated by a spring and piston motor. The valve stem 113 extends up through a wall of the casing 110 into a piston chamber or cylinder 114, where it is secured in a dished and peripherally flanged head 115. A helical compression spring 124 housed in the head 115 urges the same upward, so as to tend to close the valve 112. The piston 117 in the cylinder 114 has external shoulders 118 and 119 for engaging small and large bores of the cylinder, and a packing groove 120 in the large shoulder 119. The larger cylinder bore has a removable liner 121, bevelled at its upper end and grooved near its lower end so as to be completely overtraveled and thus evenly worn by the piston shoulder 119. This shoulder 119 is bevelled to seat and seal on a corresponding bevel 123 of the liner 121. A helical spring 116 is interposed between the piston 117 and the flange of the part 115. This arrangement cushions the opening of the valve 112 and obviates any hammer. The pipe line 74 from the pilot valves 68, 69 is connected and opens into the cylinder 114 through a passage 125 in its removable cover 126.

In the absence of pressure above the piston 117, or when such pressure is relieved, the valve 112 is held closed by the spring 124 and the unbalanced steam pressure on the valve itself; while, when pressure is admitted above the piston 117, it compresses the spring 124 and closes the valve.

As shown in Fig. 8, the main booster throttle 50 comprises a casing 130 with beveled seats 131, 132 for a balanced valve 133 of hollow sleeve type, with beveled external flanges for co-operating with the seats 131, 132. The valve 133 is operated by a spring and piston motor arrangement, comprising a piston 135 in a chamber or cylinder 136 mounted on the valve casing 130, with a bell-crank connection 137 between the valve stem 138 and a headed rod 139, and a helical compression spring 140 acting between the rod head and the bottom of the cylinder 136 to raise the piston and depress and close the valve. As shown in Fig. 8, the rod 139 has a double flanged collar 141 between whose flanges or shoulders is engaged a roller 142 on one end of the rocker 137; while the other end of said rocker is pivoted to the valve stem 138 at 143. As here shown, the upper end of the rod 139 has a central spherical boss 144 engaging a corresponding concave spherical seat in the piston 135, so as to obviate any tendency to bind the piston in the cylinder 136. The conformation and construction of the piston 135 and the cylinder 136, and their interengagement, etc., are similar to what has already been described in connection with Fig. 7. The pipe line 80 from the booster-entraining motor 22 is connected to the upper end of the cylinder 136, into a chamber 144ª opening upward into a downward-open cavity 145 in the removable cylinder cover 146.

When pressure is admitted to the piston 135, it compresses the spring 140 and opens the valve 133; when pressure is relieved, the valve closes.

As here shown, a hand throttle 149 of any suitable construction may be mounted in the casing 130 along with the pressure operated throttle valve 133, so that the booster 11 may be arbitrarily regulated or shut off as desired.

As shown in Fig. 9, the pilot valve 82 comprises a casing 150 having therein a pressure chamber 151 connected in the pipe line 80 (leading to the main booster throttle 50) at either side, an exhaust chamber 152 with a lateral exhaust port 153, and an intermediate chamber 154 to which is connected the pipe 81 leading to the cylinder cock motor 60. For connecting the intermediate chamber 154 with the pressure chamber 151 and with the exhaust space 152, there are alined ports 155 and 156 controlled by valves 157 and 158 adapted to seat over the ports in the chambers 151 and 152, and engaging one another end to end in the intermediate space 154. Above the valve 157 is a helical compression spring 159 tending to seat it and close the pressure valve 157 and to open the exhaust valve 158. Within the chamber 152 is a frusto-conical inner casing 160 whose interior affords bores for a piston 161 and its reduced end or "stem" portion 162. The piston 161 has a peripheral packing 163 to make it fluid-tight in its bore in the casing 160, and the latter has a multiplicity of longitudinal grooves 164 extending to the far edge of this packing, to reduce the initial friction of the piston and prevent it from sticking. The extreme end of the stem 162 is slightly larger than the rest, and has a packing 165 to make it fluid-tight in its bore in the casing 160. A helical compression spring 166 around the stem 162 acts to depress the piston 161 away from the valve 158, to the position shown in Fig. 9; so, likewise, does a helical compression spring 167 mounted around the port 156 and acting on the end of the stem 162, through an interposed dished plate 168. From the end of the stem 162 a pin 169 projects through a hole in the plate 168, to engage the valve 158 when the piston 161 rises. This pin 169 is yieldingly pressed outward by a helical compression spring 170 mounted in a bore in the stem 162. The steam pressure in the main booster supply pipe 49 beyond the throttle 50 has free access to the lower side of the piston 161 through a connection or opening 171. The opening 171 is surrounded by a shoulder 172 on which the correspondingly shouldered piston 161 is adapted to seat and seal.

So long as the pressure in the pipe 49 is not more than required for idling the booster, the piston 161 remains seated at 172; the exhaust valve 158 is unseated, so that the pipe 81 and the cylinder cock motor 60 are open to exhaust; and the pressure valve 157 is seated, so as to prevent admission of pressure to said pipe 81. When, however, the pressure in the pipe 49 reaches or approaches full value, it overcomes the springs 166 and 167 and raises the piston 161, closing the exhaust valve 158, and opening the pressure valve 157 to admit pressure to the pipe 81,—thus ultimately closing the cylinder cocks 56, as already described. In this condition, the steam pressure acts on the full area of the large portion of the piston 161, instead of only on that of the small portion defined by the shoulder 172, so that the piston is amply held up by the steam pressure, regardless of any ordinary fluctuations therein. When the piston 161 is raised, a bevel 173 thereon seats and seals on a corresponding bevel 174 of the casing 160, thus minimizing leakage of steam past it. Also, its enlarged upper end over-travels and unseals lateral ports 175 in the corresponding portion of the inner casing 160, thus allowing any steam that may leak past the large lower portion of the piston to escape into the exhaust space 152.

When the steam pressure in the pipe 49 is reduced by closing of the main booster throttle 50, the piston 161 descends, shutting off pressure from the pipe 81 and opening it to exhaust and thus ultimately opening the cylinder cocks 56 again.

As shown in Fig. 10, the double check valve 73 (or 79) comprises a casing with alined ports 181, 181 in its ends, to which the pipes 72, 72 (or 77, 78) are connected, and a cylindrical bore between these ports. Into this bore open lateral ports 182, 182, both in direct connection with the pipe 74 (or 80). In the bore is a pressure responsive piston member 183 with rounded valve ends 184, 184 for the ports 181, 181. When pressure is admitted to either pipe 72 and the corresponding port 181, it forces the piston 183 to the other end of the casing and seats its valve 184 over the other port 181 and the other line 72. This allows pressure to be either admitted or exhausted through the line 74 and the open line 72, but prevents pressure from blowing from one line 72 into the other directly to exhaust,—for, as already explained, both lines 72 are normally open to exhaust excepting when one of the valves 68 or 69 is actuated by the lever 65 (when "in the corner") to admit pressure to the corresponding line 72.

I claim:—

1. The combination with a locomotive reverse and a reversible booster and its cylinder cocks, of means controlled by the locomotive reverse for correlatively throwing the booster into forward or reverse, and means also controlled by the locomotive reverse for closing the booster cylinder cocks.

2. The combination with a locomotive reverse and a reversible booster and its cylinder cocks, of means controlled by the locomotive reverse for correlatively throwing the booster into forward or reverse, and means controlled by the throwing of the booster either way for subsequently closing its cylinder cocks.

3. The combination with a locomotive reverse and a reversible booster and its throttle and cylinder cocks, of means controlled by the locomotive reverse for correlatively throwing the booster into forward or reverse, means controlled by the throwing of the booster reverse either way for opening the booster throttle, and means controlled by the admission of motive fluid to the booster by the throttle for subsequently closing the booster cylinder cocks.

4. The combination with a locomotive reverse and a reversible booster and its throttle and cylinder cocks, of means controlled by the locomotive reverse for preliminarily admitting motive fluid to the booster, means also controlled by the locomotive reverse for correlatively throwing the booster into forward or reverse, means controlled by the throwing in of the booster either way for opening the booster throttle, and means controlled by the admission of motive fluid to the booster by the throttle, as aforesaid, for subsequently closing its cylinder cocks.

5. A control system for a reversible railway booster with pressure-operated throttle, double acting pressure means for throwing the booster into forward or reverse, and pressure-operated cylinder cocks comprising means controlled by the locomotive reverse for admitting pressure to throw the booster reverse correspondingly, means controlled by the operation of said double acting means for admitting pressure to open the booster throttle when the booster reverse is thrown either way, and means controlled by the admission of motive fluid to the booster for subsequently admitting pressure to close the cylinder cocks when the booster reverse is thrown either way.

6. A control system for a reversible railway booster with pressure-operated throttle, double acting pressure means for throwing the booster into forward or reverse, and pressure operated cylinder cocks, comprising means controlled by the locomotive reverse for preliminarily admitting motive fluid to the booster when the locomotive reverse is thrown either way, means also controlled by the locomotive reverse for admitting pressure to throw the booster reverse correspondingly, and means controlled by the operation of said double-acting means for admitting pressure to open the booster throttle when the booster reverse is thrown either way and for subsequently admitting pressure to close the cylinder cocks.

7. A control system for a reversible railway booster with double-acting pressure means for throwing the booster into forward or reverse, and pressure-operated means for other booster-starting operations comprising means controlled by the locomotive reverse lever for admitting and exhausting pressure to and from said double-acting means to throw the booster either way and for also admitting the pressure to said other pressure means, with double check means for preventing blowing off of admitted pressure from the latter while permitting exhaust therefrom when the locomotive reverse is in an intermediate position not admitting pressure.

8. The combination of a locomotive, a reversing mechanism therefor, a booster, means for entraining and disentraining the booster with the locomotive for either direction of travel, means actuated by the reversing mechanism in either direction of locomotive travel for causing the proper entrainment of the booster, means for idling the booster, and means for preventing the entrainment by said reversing mechanism in either direction of travel whenever an idling operation is in progress.

9. The combination of a locomotive, a reversing mechanism therefor, a booster, means for entraining the booster with the locomotive for aiding forward running, means for entraining the booster with the locomotive for aiding backward running, and means controlled by the locomotive reverse for causing correlative entrainment of the booster.

10. The combination of a locomotive, a normally inoperative booster motor therefor, a pilot valve for controlling booster operation, a valve for idling the booster prior to operation, and means for locking said pilot valve in inoperative position during an idling operation.

11. The combination of a locomotive, a normally inoperative booster motor therefor, a fluid pressure controlling system for the booster, a pilot valve for admitting the fluid to said system to effect operation of the booster, a second valve for admitting fluid to said system to cause idling of the booster prior to operation, and a fluid actuated means for locking the pilot valve in inoperative position during an idling operation.

12. The combination of a locomotive, a normally inoperative booster motor therefor, a fluid pressure controlling system for the booster, a pilot valve for admitting the fluid to said system to effect operation of the booster, a second valve for admitting fluid to said system to cause idling of the booster prior to operation, and a fluid actuated means for locking the pilot valve in inoperative position during an idling operation, said fluid actuated means being operated by the pressure of the fluid admitted by said second valve for an idling operation.

13. The combination with a locomotive reverse, of a locomotive booster, a booster throttle, means for entraining the booster with the locomotive for aiding forward running, means for entraining the booster with the locomotive for aiding backward running, and means controlled by the locomotive reverse for causing correlative entrainment of the booster and opening of the booster throttle.

14. The combination with a locomotive reverse, of a locomotive booster, a booster throttle, means for entraining the booster with the locomotive for aiding forward running, means for entraining the booster with the locomotive for aiding backward running, means controlled by the locomotive reverse for causing correlative entrainment of the booster, and means subordinated to said last mentioned means for opening the booster throttle.

15. The combination with a locomotive reverse, of a locomotive booster, a booster throttle, means for entraining the booster with the locomotive for aiding forward running, means for entraining the booster with the locomotive for aiding backward running, means controlled by the locomotive reverse for causing correlative entrainment of the booster and opening of the booster throttle, and means for preliminarily admitting motive fluid to the booster for idling it prior to entrainment.

16. The combination with a locomotive reverse, of a locomotive booster, a booster throttle, means for entraining the booster with the locomotive for aiding forward running, means for entraining the booster with the locomotive for aiding backward running, means controlled by the locomotive reverse for causing correlative entrainment of the booster and opening of the booster throttle, and means also controlled by the locomotive reverse for admitting motive fluid to the booster for idling it during an entraining operation.

17. The combination with a locomotive reverse, of a locomotive booster, a booster throttle, means for entraining the booster with the locomotive for aiding forward running, means for entraining the booster with the locomotive for aiding backward running, means controlled by the locomotive reverse for causing correlative entrainment of the booster, and means for preliminarily admitting motive fluid to the booster for idling it prior to entrainment.

18. The combination with a locomotive reverse, of a locomotive booster, a booster throttle, means for entraining the booster with the locomotive for aiding forward running, means for entraining the booster with the locomotive for aiding backward running, means controlled by the locomotive reverse for causing correlative entrainment of the booster, and means also controlled by the locomotive reverse for admitting motive fluid to the booster for idling it during an entraining operation.

19. The combination of a locomotive, a booster motor, a booster throttle, means for entraining the booster with the locomotive for aiding forward running, means for entraining the booster with the locomotive for aiding backward running, and means for entraining the booster and opening the throttle correlatively with the direction of locomotive operation.

20. The combination of a locomotive, a booster motor, a booster throttle, means for entraining the booster with the locomotive for aiding forward running, means for entraining the booster with the locomotive for aiding backward running, and means for entraining the booster and opening the throttle correlatively with the direction of locomotive operation together with means for preliminarily admitting motive fluid to the booster for idling it prior to entrainment.

21. The combination of a locomotive, a booster motor, a booster throttle, means for entraining the booster with the locomotive for aiding forward running, means for entraining the booster with the locomotive for aiding backward running, and means for entraining the booster and opening the throttle correlatively with the direction of locomotive operation together with means for admitting motive fluid to the booster for idling it during an entraining operation in either direction.

In testimony whereof I have hereunto signed my name.

FRANK R. PETERS.